(12) United States Patent
Yang

(10) Patent No.: US 6,989,495 B2
(45) Date of Patent: Jan. 24, 2006

(54) PORTABLE SCALE HAVING ACTUATABLE GRIP DEVICE

(76) Inventor: A Mei Yang, No. 241, Guang Jen Road, Dali City, Taichung Hsien (TW) 412

(*) Notice: Subject to any disclaimer, the term of this patent is extended or adjusted under 35 U.S.C. 154(b) by 152 days.

(21) Appl. No.: 10/791,450

(22) Filed: Mar. 1, 2004

(65) Prior Publication Data

US 2005/0189153 A1    Sep. 1, 2005

(51) Int. Cl.
A01K 97/00 (2006.01)
A01K 97/14 (2006.01)
G01G 19/60 (2006.01)
G01G 19/00 (2006.01)

(52) U.S. Cl. ............... 177/131; 177/148; 177/233; 43/5

(58) Field of Classification Search ......... 177/131, 177/148–149, 232–233
See application file for complete search history.

(56) References Cited

U.S. PATENT DOCUMENTS

| | | | | |
|---|---|---|---|---|
| 206,659 A | * | 8/1878 | Brigham | 177/148 |
| 207,204 A | * | 8/1878 | Payson | 177/131 |
| 1,464,232 A | * | 8/1923 | Beam | 177/131 |
| 2,619,859 A | * | 12/1952 | Peronto | 43/53.5 |
| 2,807,495 A | * | 9/1957 | Pillstrom | 294/104 |
| 2,836,004 A | * | 5/1958 | Otto | 43/53.5 |
| 3,848,689 A | | 11/1974 | Hilterhaus | 177/233 |
| 4,078,625 A | | 3/1978 | Loeb | 177/233 |
| 4,454,831 A | | 6/1984 | Gallo | 116/200 |
| 5,031,710 A | | 7/1991 | Parker et al. | 177/210 FP |
| 5,119,585 A | | 6/1992 | Camp | 43/53.5 |
| 6,094,996 A | | 8/2000 | Campbell et al. | 73/862 |
| 6,246,017 B1 | | 6/2001 | Yang | 177/148 |
| 6,560,913 B1 | | 5/2003 | Liao | 43/5 |
| 6,696,650 B2 | * | 2/2004 | Muller et al. | 177/148 |
| 6,766,609 B1 | * | 7/2004 | Aboczky | 43/53.5 |
| 6,943,304 B1 | * | 9/2005 | Brady et al. | 177/148 |
| 2004/0007396 A1 | * | 1/2004 | Muller et al. | |

* cited by examiner

Primary Examiner—Randy W. Gibson
(74) Attorney, Agent, or Firm—Charles E. Baxley

(57) ABSTRACT

A portable scale includes a spring member coupling a grip device to a weighing device, to allow the grip device to be moved relative to the weighing device against the spring member to weigh objects. The grip device includes a fixed jaw having a hook member for attaching to the objects, and a pivotal jaw pivotally attached to the fixed jaw and having a hook member movable toward the hook member of the fixed jaw, to grip the objects, and to allow the objects to be solidly attached to the grip device before conducting a weighing operation. A latch may be used to latch the pivotal jaw to the fixed jaw.

10 Claims, 5 Drawing Sheets

PORTABLE SCALE HAVING ACTUATABLE GRIP DEVICE

BACKGROUND OF THE INVENTION

1. Field of the Invention

The present invention relates to a portable scale, and more particularly to a portable scale having an operatable or actuatable grip device for being actuated by users to hook or to grip objects, such as fishes, etc.

2. Description of the Prior Art

Various kinds of typical portable scales have been developed and comprise a hook for hooking to objects, such as fishes, and a weighing device for weighing the objects.

For example, U.S. Pat. No. 3,848,689 to Hilterhaus, U.S. Pat. No. 4,078,625 to Loeb, U.S. Pat. No. 4,454,831 to Gallo, and U.S. Pat. No. 6,246,017 to Yang disclose several of the typical portable scales each comprising a hook for hooking to objects, and a weighing device for weighing the objects. However, the hooks of the typical portable scales may hurt the fishes or the like.

U.S. Pat. No. 5,119,585 to Camp, and U.S. Pat. No. 6,560,913 to Liao disclose two further typical portable scales each comprising a pair of jaws for hooking to or for gripping the objects, such as fishes. However, the jaws are coupled to the weighing device, and may only be forced toward each other to grip the objects by the weight of the objects, and when the weighing device is elevated by the users.

Accordingly, when the weighing device is elevated by the users to weigh the objects, the jaws have not yet been solidly forced toward each other, and thus may not solidly grip the objects while weighing the objects. The most important defect is that the jaws may not be operated or actuated by the users to solidly grip the objects before weighing operations.

U.S. Pat. No. 5,031,710 to Parker et al., and U.S. Pat. No. 6,094,996 to Campbell et al. disclose two further typical portable scales each comprising an electric weighing device for electrically weighing the objects to be weighed. The typical electric weighing devices also fail to provide two jaws that may be operated or actuated by the users to solidly grip the objects before weighing operations.

The present invention has arisen to mitigate and/or obviate the afore-described disadvantages of the conventional portable scales.

SUMMARY OF THE INVENTION

The primary objective of the present invention is to provide a portable scale including an operatable or actuatable grip device for being actuated by users to hook or to grip objects, such as fishes, etc.

In accordance with one aspect of the invention, there is provided a portable scale comprising a weighing device, a grip device for gripping objects to be weighed, and a spring member including a first end coupled to the weighing device and a second end coupled to the grip device, for coupling the grip device to the weighing device, and to allow the grip device to be moved relative to the weighing device against the spring member to weigh the objects. The grip device includes a fixed jaw having a hook member for attaching to the objects, and a pivotal jaw pivotally attached to the fixed jaw and having a hook member movable toward the hook member of the fixed jaw, to grip the objects, and to allow the objects to be solidly attached to the grip device before conducting a weighing operation.

The grip device includes a carrier attached to the second end of the spring member, the fixed jaw is secured onto the carrier. The fixed jaw is secured onto the carrier with a shaft, and the pivotal jaw is pivotally attached to the fixed jaw with the shaft.

The grip device includes means for latching the pivotal jaw to the fixed jaw. The latching means includes a plurality of teeth provided on the pivotal jaw, and a latch pivotally attached to the fixed jaw and having a first end engageable with the teeth of the pivotal jaw, to selectively latch the pivotal jaw to the fixed jaw. The latching means includes means for biasing the first end of the latch to engage with the teeth of the pivotal jaw. The latch includes a hand grip attached thereon.

The fixed jaw includes a link secured thereto and coupled to the second end of the spring member. The weighing device includes a housing, a threaded member rotatably attached to the housing, and a coupler threaded to the threaded member and attached to the first end of the spring member.

The housing includes a channel formed therein, a carrier slidably received therein, a follower slidably attached to the channel of the housing, and an indicator attached to the carrier and movable along the channel of the housing, and engageable with the follower to move the follower along the channel of the housing while conducting the weighing operation.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
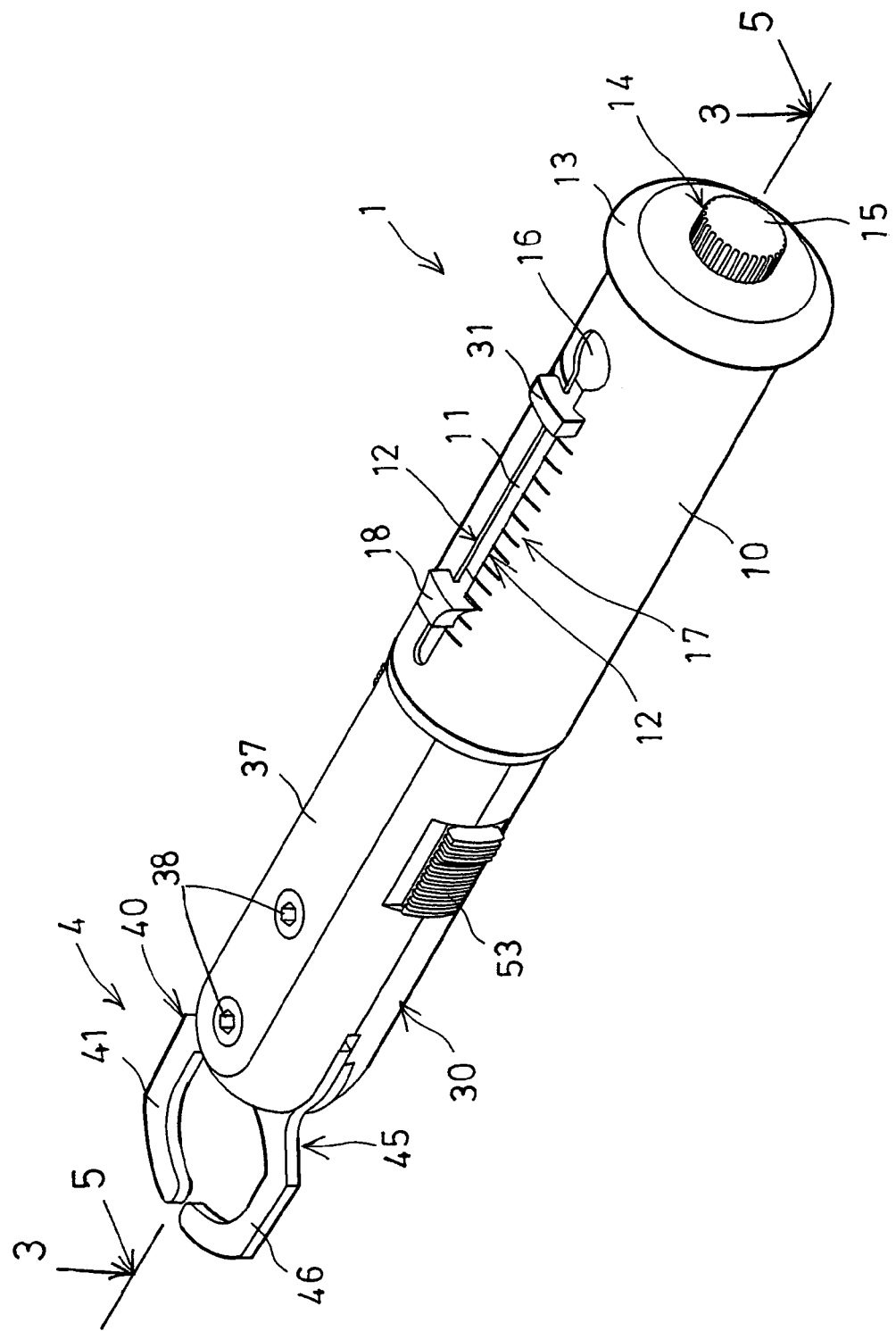
FIG. 1 is a perspective view of a portable scale in accordance with the present invention.
Figure 2:
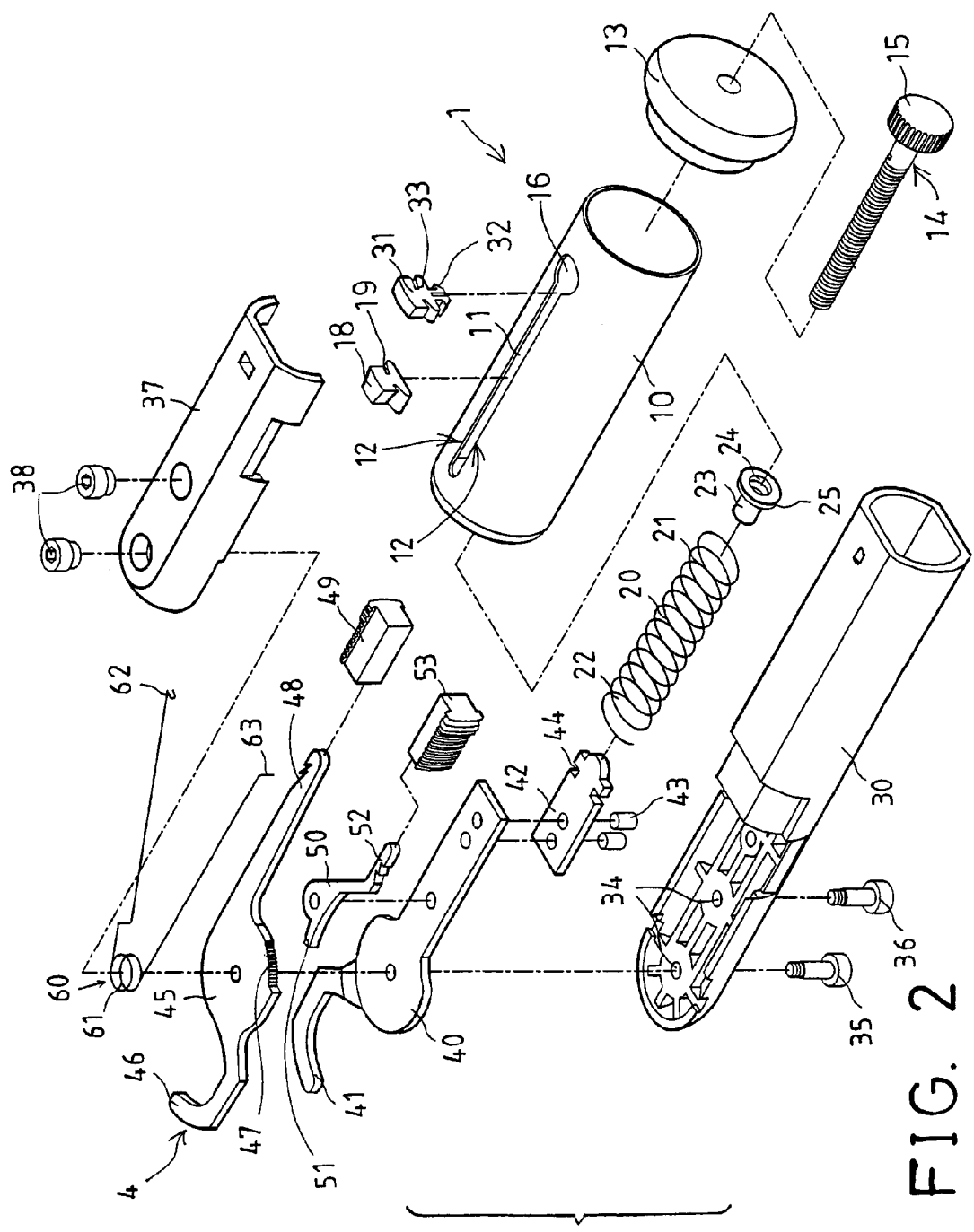
FIG. 2 is an exploded view of the portable scale.
Figure 3:
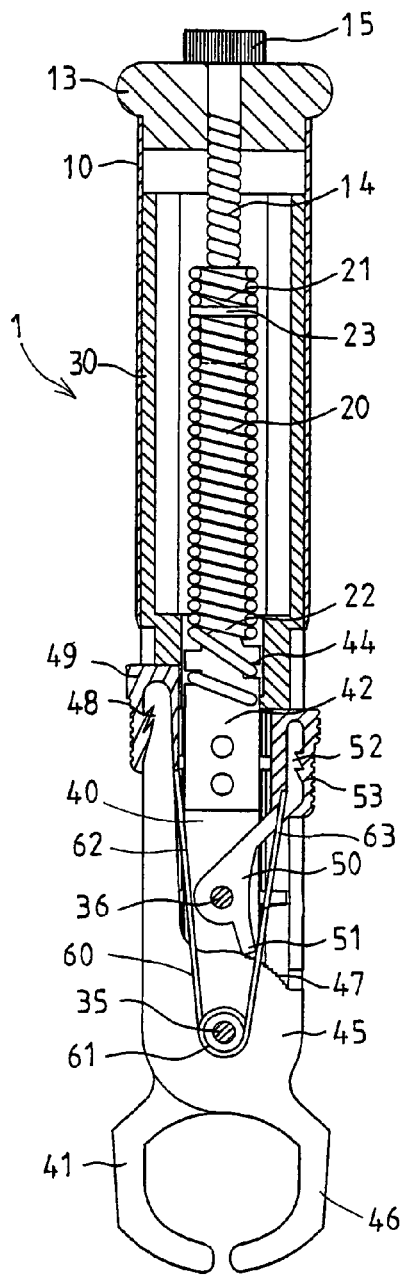
FIG. 3 is a cross sectional view of the portable scale, taken along lines 3—3 of FIG. 1.

Referring to the drawings, and initially to FIGS. 1–3, a portable scale in accordance with the present invention comprises a weighing device 1 including a housing 10 having a longitudinal channel 11 formed therein and defined by a pair of opposite flanges 12, a cap 13 attached to one end of the housing 10, and including a bolt or a threaded member 14 rotatably attached to the cap 13 and received in the housing 10 and having a knob 15 extended out of the housing 10 and the cap 13 for being rotated or operated by the users.

It is preferable that the housing 10 includes an enlarged opening 16 formed therein and communicating with one end of the channel 11 thereof, and includes a graduation 17 provided thereon (FIG. 1), such as arranged alongside the channel 11 of the housing 10, for weight indication purposes. A follower 18 is slidably received in the channel 11 of the housing 10, and includes a pair of slits 19 formed therein to slidably receive the opposite flanges 12 of the housing 10, and thus to slidably attach the follower 18 to the housing 10.

The follower 18 may be engaged into the channel 11 of the housing 10 via the enlarged opening 16 of the housing 10, to allow the opposite flanges 12 of the housing 10 to be engaged into the corresponding slits 19 of the follower 18. The follower 18 is attached to the housing 10 with such as a force-fitted engagement, to allow the follower 18 to be moved along the channel 11 of the housing 10, and to be positioned to the housing 10 at any position relative to the graduation 17, to indicate weights of objects.

A spring member 20 includes two ends 21, 22, in which one end 21 thereof is to be engaged onto or coupled to the threaded member 14. For example, a coupler 23 includes an inner thread 24 formed therein to thread with the threaded member 14, and includes a peripheral flange 25 extended laterally or radially out therefrom to engage with the one end 21 of the spring member 20, and to attach or to couple the coupler 23 to the one end 21 of the spring member 20.

A carrier 30 is to be coupled to the other end 22 of the spring member 20, and includes a grip device 4 attached thereto for gripping the objects to be weighed, and for allowing the objects to be weighed by the weighing device 1. An indicator 31 includes such as a catch 32 for attaching to the carrier 30 and for being moved in concert with the carrier 30, and also includes a pair of slits 33 formed therein to slidably receive the opposite flanges 12 of the housing 10, and thus to slidably attach the indicator 31 to the housing 10.

Figure 5:
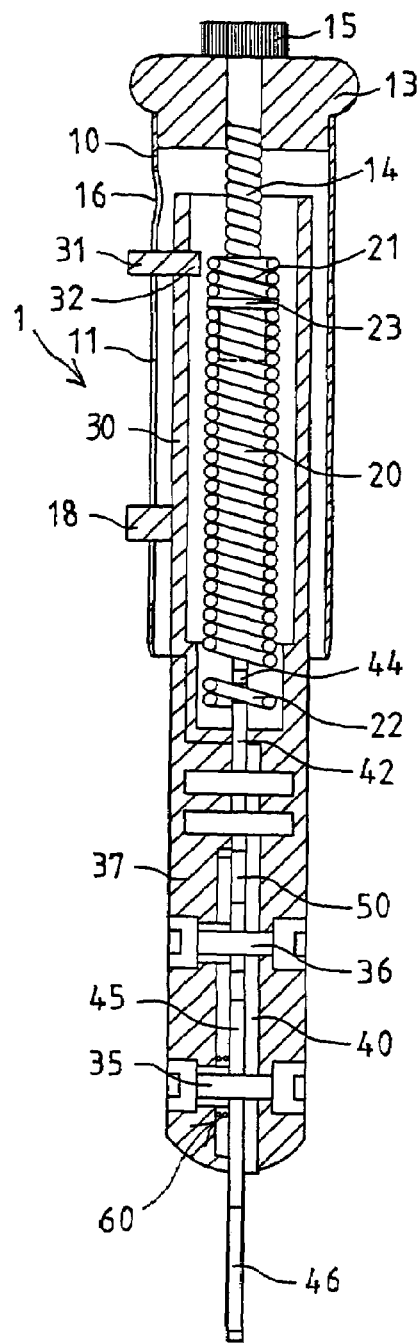
FIG. 5 is a cross sectional view taken along lines 5—5 of FIG. 1.
Figure 6:
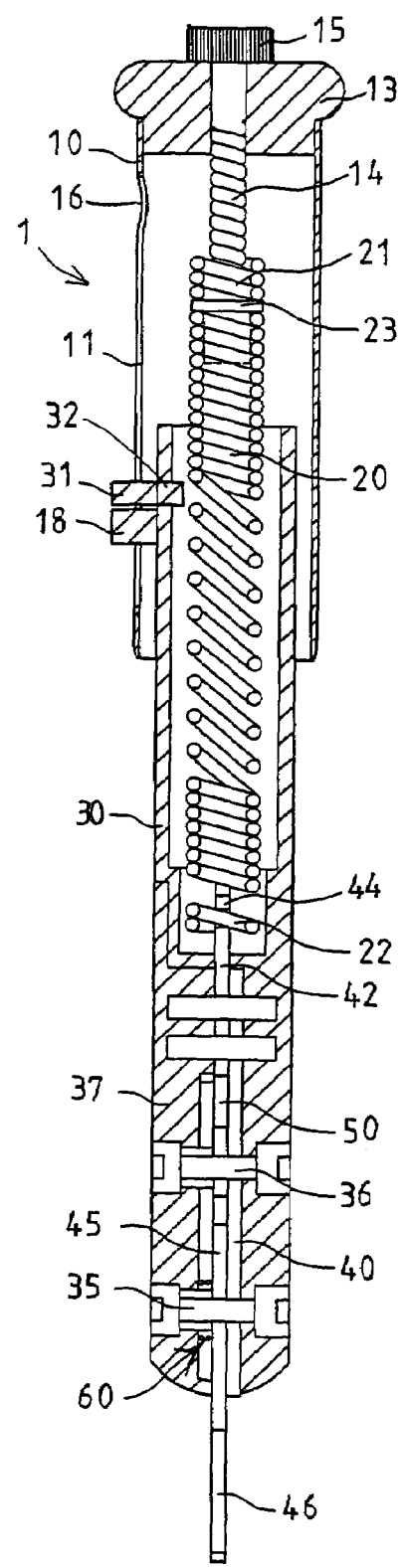
FIG. 6 is a cross sectional view similar to FIG. 5, illustrating the operation of the portable scale.

In operation, as shown in FIGS. 5 and 6, when the grip device 4 grips an object to be weighed, or when the carrier 30 is moved relative to the housing 10 against the spring member 20, the follower 18 may be forced to move along the channel 11 of the housing 10 by the indicator 31 that is attached to the carrier 30. When the object is released or when the spring member 20 recovers or pulls the carrier 30 back into the housing 10, the follower 18 may be positioned to the housing 10 to indicate the weights of the objects with the graduation 17.

The carrier 30 includes two holes 34 formed therein to receive a shaft 35 and an axle 36 respectively. The grip device 4 includes a fixed jaw 40 solidly secured to the carrier 30 with such as the shaft 35 and the axle 36, and includes a hook member 41 for hooking to the objects to be weighed. A link 42 is secured to the fixed jaw 40 with such as fasteners 43, and includes a pair of slits 44 formed therein to receive or to couple to the other end 22 of the spring member 20, in order to couple the carrier 30 to the spring member 20. The spring member 20 may also be directly coupled to the carrier 30 instead of coupling to the carrier 30 indirectly via the fixed jaw 40.

A pivotal jaw 45 is pivotally secured to the carrier 30 and/or the fixed jaw 40 with the shaft 35, and includes a hook member 46 provided on one end thereof and movable toward and away from the hook member 41 of the fixed jaw 40, for gripping the objects together with the hook member 41 of the fixed jaw 40. The pivotal jaw 45 includes a number of teeth 47 formed or provided on the intermediate portion thereof, and includes a hand grip 49 attached to the other end 48 thereof to move or to actuate the hook member 46 toward the hook member 41 of the fixed jaw 40.

A latch 50 is pivotally attached to the carrier 30 and/or to the fixed jaw 40 with such as the axle 36, and includes one end 51 for engaging with the teeth 47 of the pivotal jaw 45, and to position or to lock the pivotal jaw 45 to the fixed jaw 40 at selected positions. The latch 50 includes another end 52 having a hand grip 53 attached thereto for rotating the latch 50 relative to the carrier 30 and the pivotal jaw 45, to selectively disengage the one end 51 of the latch 50 from the teeth 47 of the pivotal jaw 45, and thus to release the pivotal jaw 45 relative to the fixed jaw 40, and to allow the pivotal jaw 45 to be rotated relative to the fixed jaw 40 again.

Another spring element 60 includes an intermediate portion 61 coupled to the fixed jaw 40 or to the carrier 30 with the shaft 35 or the axle 36, and includes two ends 62, 63 engaged with the other end 48 of the pivotal jaw 45 and the other end 52 of the latch 50, to bias the one end 51 of the latch 50 to engage with the teeth 47 of the pivotal jaw 45, and thus to position or to lock the pivotal jaw 45 to the fixed jaw 40 at the selected positions. A cover 37 may further be secured to the carrier 30 with such as nuts 38, to stably retain the jaws 40, 45 and the spring element 60 to the carrier 30.

Figure 4:
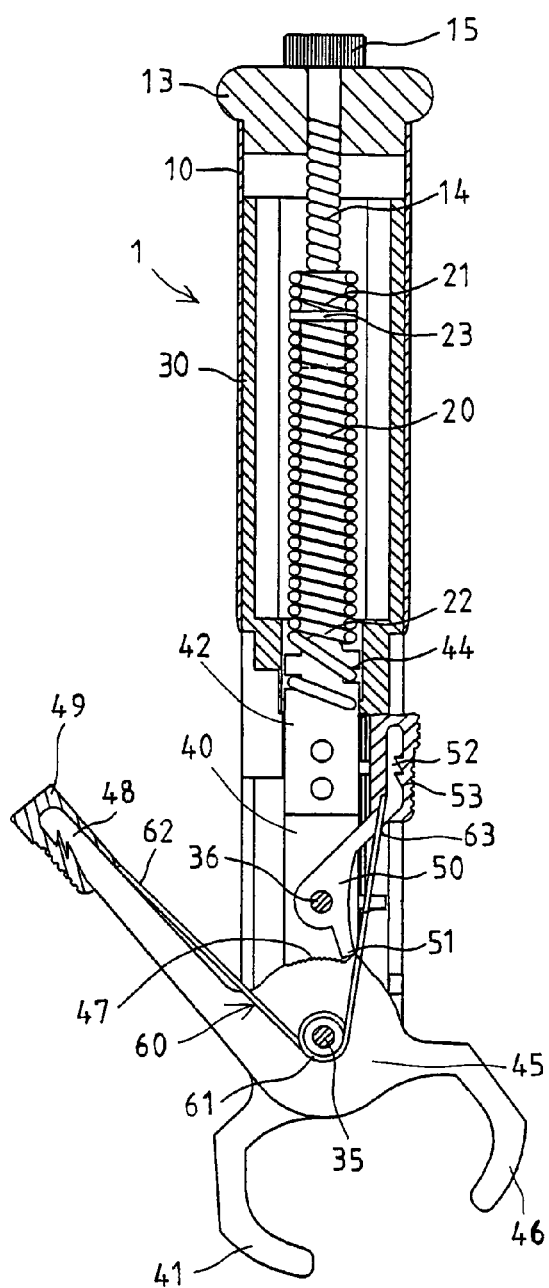
FIG. 4 is a cross sectional view similar to FIG. 3, illustrating the operation of the portable scale.

In operation, as shown in FIG. 4, for weighing the objects, the hook member 41 of the fixed jaw 40 may first be engaged onto the objects, and the pivotal jaw 45 may then be moved relative to the fixed jaw 40 or the carrier 30 to force the hook member 46 of the pivotal jaw 45 toward the hook member 41 of the fixed jaw 40, in order to grip the objects together with the hook member 41 of the fixed jaw 40. The one end 51 of the latch 50 may engage with the teeth 47 of the pivotal jaw 45, to position or to lock the pivotal jaw 45 to the fixed jaw 40 at the selected positions.

It is to be noted that the fixed jaw 40 is solidly attached or secured to the carrier 30, such that the hook member 41 of the fixed jaw 40 may be easily and solidly engaged onto the objects. The pivotal jaw 45 is rotatable or actuatable by the users, to force the hook member 46 of the pivotal jaw 45 toward the hook member 41 of the fixed jaw 40, such that the objects may be solidly and easily gripped together with the hook members 41, 46 of the fixed jaw 40 and the pivotal jaw 45, before conducting the weighing operations with the weighing device 1.

It is to be noted that the fixed jaw 40 of the grip device 4 may also be directly secured or coupled to the other end 22 of the spring member 20 without the carrier 30. The conventional portable scales fail to provide a grip device 4 having a pivotal jaw 45 actuatable or operatable or movable relative to the fixed jaw 40 for allowing the grip device 4 to grip the objects by the users.

After the objects have been attached to the grip device 4 by the users, the users may elevate the housing 10 to suspend the objects, and to have the carrier 30 to be moved downwardly relative to the housing 10 against the spring member 20. The follower 18 may then be forced to move downwardly along the channel 11 of the housing 10 by the indicator 31 that is attached to the carrier 30, in order to indicate the weights of the objects with the follower 18 and the graduation 17.

Figure 7:
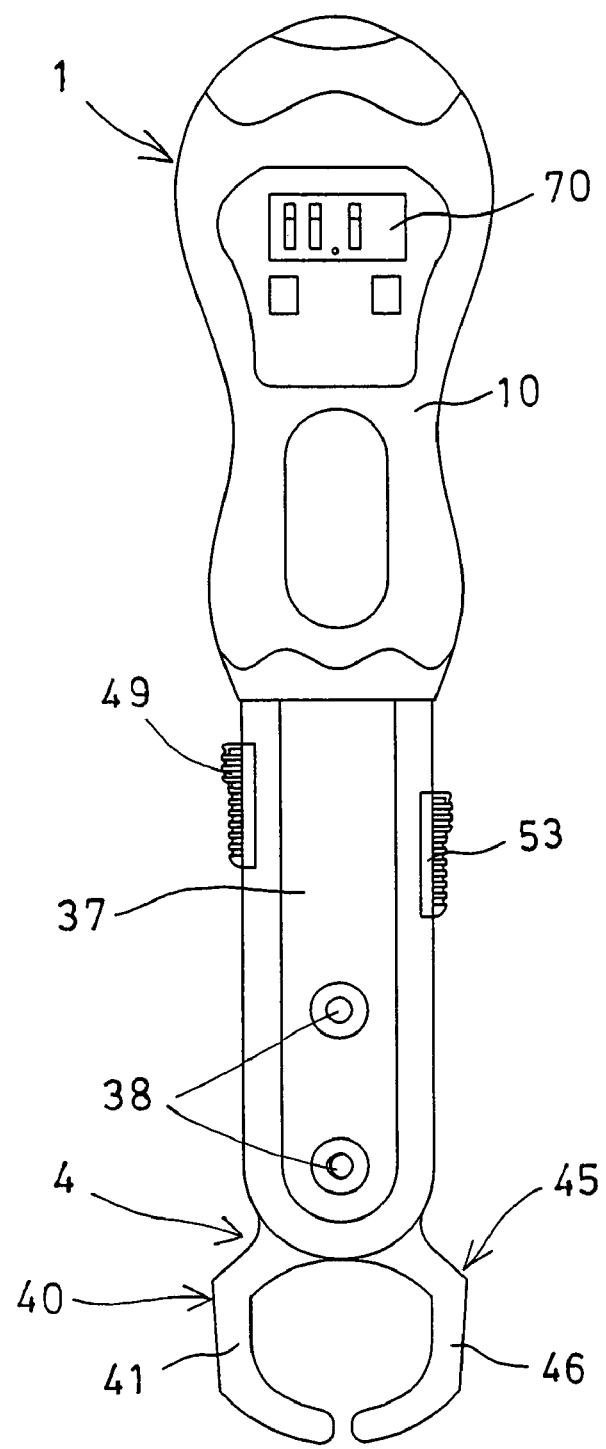
FIG. 7 is a plan schematic view illustrating the other embodiment of the portable scale.

Referring next to FIG. 7, an electric weighing device 70 may also be provided and attached to the housing 10 for weighing purposes. Two examples of the electric weighing device 70 have been disclosed in U.S. Pat. No. 5,031,710 to Parker et al., and U.S. Pat. No. 6,094,996 to Campbell et al., which may be taken as references for the present invention.

Accordingly, the portable scale in accordance with the present invention includes an operatable or actuatable grip device for being actuated by users to hook or to grip the objects, such as fishes, etc.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A portable scale comprising:
   a weighing device,
   a grip device for gripping objects to be weighed, and
   a spring member including a first end coupled to said weighing device and a second end coupled to said grip device, for coupling said grip device to said weighing device, and to allow said grip device to be moved relative to said weighing device against said spring member to weigh the objects,
   wherein said grip device includes a fixed jaw having a hook member for attaching to the objects, and a pivotal jaw pivotally attached to said fixed jaw and having a hook member movable toward said hook member of said fixed jaw, to grip the objects, and to allow the objects to be attached to said grip device before conducting a weighing operation.

2. The portable scale as claimed in claim 1, wherein said grip device includes a carrier attached to said second end of said spring member, said fixed jaw is secured onto said carrier.

3. The portable scale as claimed in claim 2, wherein said fixed jaw is secured onto said carrier with a shaft, and said pivotal jaw is pivotally attached to said fixed jaw with said shaft.

4. The portable scale as claimed in claim 1, wherein said grip device includes means for latching said pivotal jaw to said fixed jaw.

5. The portable scale as claimed in claim 4, wherein said latching means includes a plurality of teeth provided on said pivotal jaw, and a latch pivotally attached to said fixed jaw and having a first end engageable with said teeth of said pivotal jaw, to selectively latch said pivotal jaw to said fixed jaw.

6. The portable scale as claimed in claim 5, wherein said latching means includes means for biasing said first end of said latch to engage with said teeth of said pivotal jaw.

7. The portable scale as claimed in claim 5, wherein said latch includes a hand grip attached thereon.

8. The portable scale as claimed in claim 1, wherein said fixed jaw includes a link secured thereto and coupled to said second end of said spring member.

9. The portable scale as claimed in claim 1, wherein said weighing device includes a housing, a threaded member rotatably attached to said housing, and a coupler threaded to said threaded member and attached to said first end of said spring member.

10. The portable scale as claimed in claim 9, wherein said housing includes a channel formed therein, a carrier slidably received therein, a follower slidably attached to said channel of said housing, and an indicator attached to said carrier and movable along said channel of said housing, and engageable with said follower to move said follower along said channel of said housing while conducting the weighing operation.

* * * * *